May 8, 1923.
R. R. GRAEBERT
1,454,233
LOCK FOR AUTOMOBILE STEERING WHEELS
Filed July 19, 1920  2 Sheets-Sheet 1
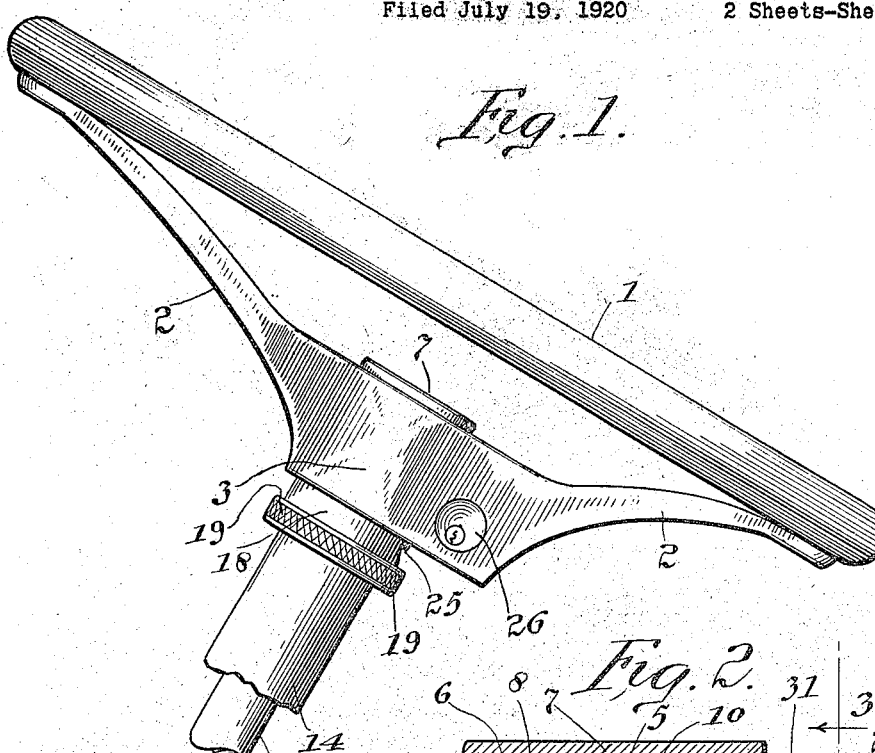
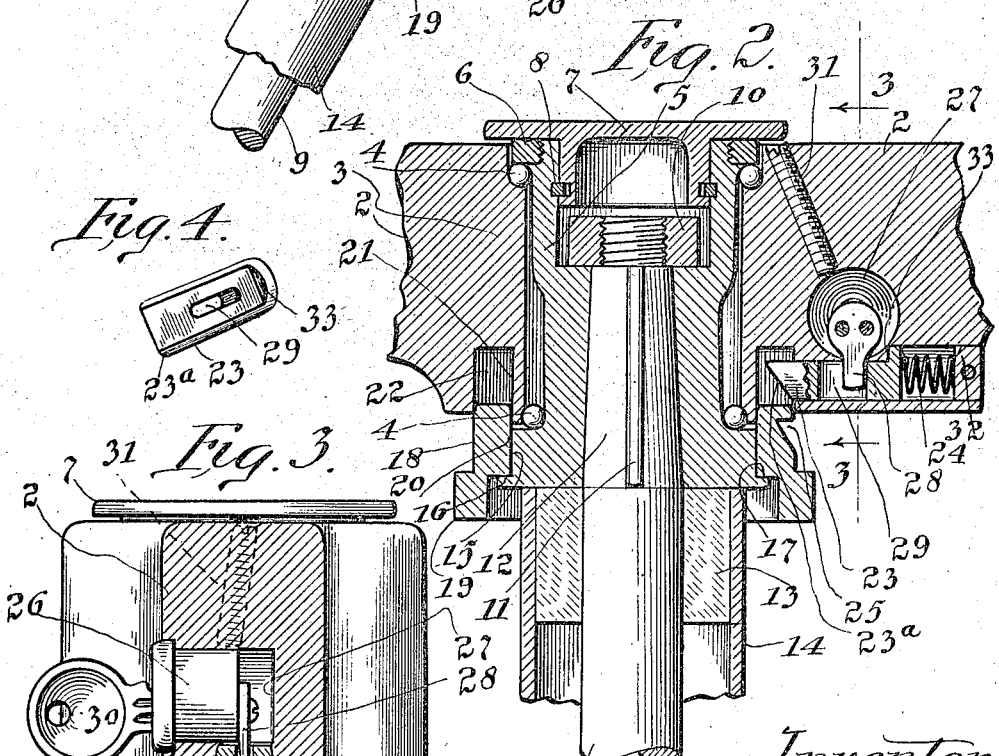
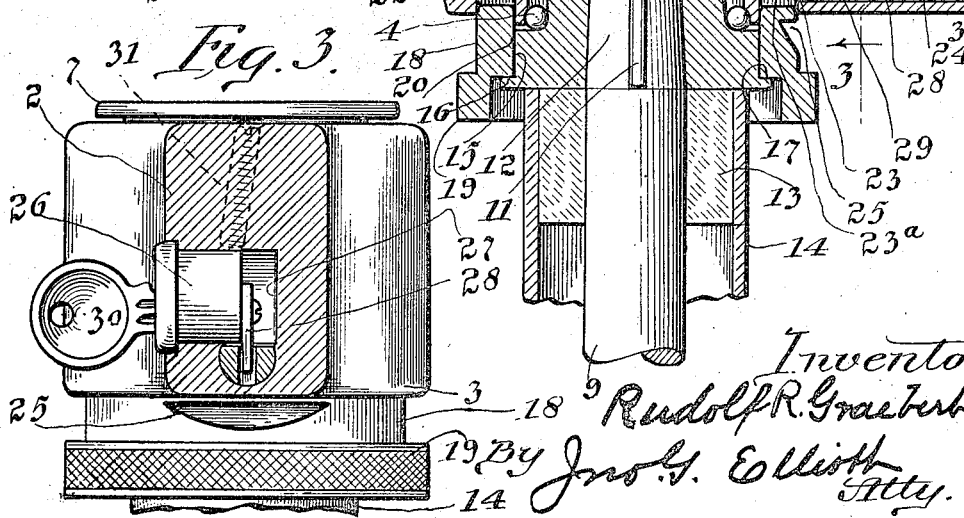
Inventor
Rudolf R. Graebert
By Jno. G. Elliott
Atty.

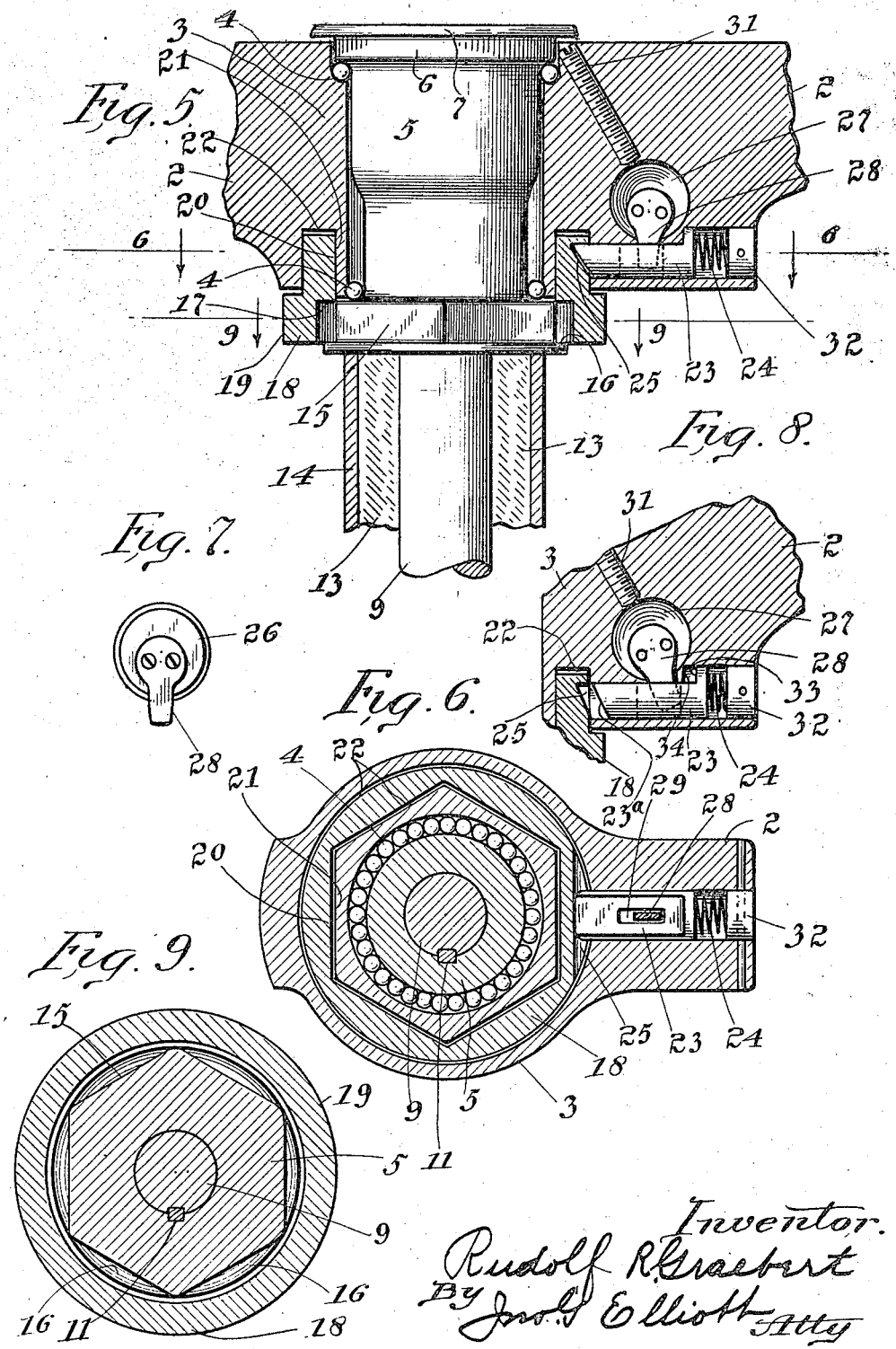

Patented May 8, 1923.

1,454,233

UNITED STATES PATENT OFFICE.

RUDOLF R. GRAEBERT, OF CHICAGO, ILLINOIS, ASSIGNOR, BY MESNE ASSIGNMENTS, TO BERNARD MEYERS, OF CHICAGO, ILLINOIS.

LOCK FOR AUTOMOBILE STEERING WHEELS.

Application filed July 19, 1920. Serial No. 397,520.

*To all whom it may concern:*

Be it known that I, RUDOLF R. GRAEBERT, a citizen of the United States, and a resident of the city of Chicago, in the county of Cook and State of Illinois, have invented certain new and useful Improvements in Locks for Automobile Steering Wheels, of which the following is a full, clear, and exact specification.

My invention is concerned with locks for steering-wheels for automobiles or trucks, of the type in which the steering-wheel is rendered inoperative or free to spin when the car is standing idle, for preventing surreptitious use of the car by unauthorized persons.

The object of my invention broadly stated, is a locking device for connecting and disconnecting an automobile steering wheel and its post, the locking member of which on being disconnected, is actuated by gravity to its locking position for connecting the wheel to the post against accidental detachment.

More specifically stated, the object of my invention is to provide an automobile steering wheel and its post with a locking device adapted to be manually operated, for disconnecting and freeing the wheel to spin around the post, and operating by gravity to connect the wheel and post and lock the wheel thereon against accidental detachment.

A further object of my invention is a steering-wheel having an axial sleeve firmly secured to the steering post therefor, provided with a locking ring adapted to be manually elevated and positively locked for freeing the wheel from its sleeve and operating by gravity for connecting and locking the sleeve and wheel, the construction and arrangement of which wheel and sleeve and the locking devices therefor, together with the lock bolt for the ring are such that when the wheel is disconnected from its sleeve, they are inaccessible for tampering purposes and can only be unlocked by the possessor of the key of a pin lock therefor.

Another object of my invention is a means for preventing a binding action or friction between the hub of a wheel and the sleeve therefor, otherwise possible, during the disconnection of the wheel from its sleeve, for controlling the operation of the post.

With these ends in view, my invention finds embodiment in certain features of novelty in the construction, combination and arrangement of parts by which the said objects and other objects are attained, all as hereinafter fully described with reference to the accompanying drawings and more particularly pointed out in the claims.

In said drawings,—

Fig. 1 is a side elevation showing the disposition of parts when the steering-wheel is locked for driving purposes.

Fig. 2 is a vertical axial section taken through the steering-wheel with the parts positioned as in Fig. 1.

Fig. 3 is a vertical section taken on line 3—3 of Fig. 2, showing a pin lock employed in the device.

Fig. 4 is a detail perspective view showing a locking bolt employed in connection with said lock.

Fig. 5 is a sectional view taken in the same plane as that of Fig. 2, but showing the disposition of parts when the wheel is unlocked or free to spin.

Fig. 6 is a plan section taken on the line 6—6 of Fig. 5.

Fig. 7 is a view showing the inner end of said lock.

Fig. 8 is a section taken in the same plane as that of Fig. 5, showing the relation of parts when the lock key is turned for retracting said locking bolt for releasing a gravity-operated wheel locking member employed in the device, and Fig. 9 is a plan section taken on line 9—9 of Fig. 5.

The preferred form of construction as shown in the drawings comprises a steering-wheel 1 and a spider 2 therefor. A hub 3 of spider 2 is provided with two rows of ball bearings 4, in which a sleeve 5 is journaled, as shown in Figs. 2 and 4. Screwed to sleeve 5 is a collar 6, which bears on one row of ball bearings, as shown. A cap 7, enclosing sleeve 5 and collar 6 for the exclusion of dust and to prevent tampering with the interior construction, is secured in a hollow end of said sleeve by means of a snap-ring 8, this being a positive and well-known securing means and adapted for purposes where parts are to be permanently secured together.

Sleeve 5 is rigidly secured to a steering-wheel shaft 9 by means of a nut 10 and key 11, a portion 12 of said shaft being tapered to insure a tight fit. Shaft 9 is journaled in a bearing 13 provided at the upper end of a stationary steering column 14, said bearing being of fiber or other suitable material.

The lower end of sleeve 5 is provided with a hexagonal exterior surface 15 and a plurality of flanges having shoulders 16 adapted to contact with a shoulder 17 of a wheel-locking ring 18 for supporting the latter in the locking or operative position thereof, as shown in Fig. 2. Ring 18 is provided with an enlarged depending portion 19 having an exterior knurled surface to facilitate gripping thereof by the operator. An interior hexagonal surface 20 is formed in ring 18 to fit loosely on surface 15 of sleeve 5 and on a hexagonal surface 21 formed on the inner wall of an annular recess 22 in hub 3, the outer wall of said recess being cylindrical, as shown in Fig. 6.

In the locking position of ring 18, as shown in Fig. 2, shoulder 17 rests on shoulder 16, and the interior hexagonal surface 20 of said ring conforms not only to hexagonal surface 21, but also to hexagonal surface 15 on sleeve 5, thus preventing movement of said sleeve relative to hub 3. Since the weight of ring 18 is sufficient to hold the same in this locking position, wheel 1 is operative for steering purposes, and will remain so until said ring is moved upward out of engagement with hexagonal surface 15.

In the unlocking position of ring 18, as shown in Fig. 5, hexagonal surface 20 of said ring conforms only to hexagonal surface 21 in hub 2, the ring having been raised, by the operator, to such an extent as to permit the same to rotate freely around hexagonal surface 15 on sleeve 5. Ball bearings 4 now become operative, and permit the wheel to spin around sleeve 5 without imparting any motion to shaft 9.

When ring 18 is raised to the position shown, a locking-bolt 23 is first pushed back against the resistance of a spring 24, and then automatically engaged with a notch 25 provided on said ring for positively holding the same in raised or unlocking position. It will be noted that the inner end 23ª of bolt 23 is inclined, and that pressure of ring 18 against said end will readily move the bolt.

Before ring 18 can fall by gravity for locking the steeering-wheel, locking bolt 23 must be retracted, and in order to accomplish this result, an ordinary pin lock 26 is inserted in a recess 27 formed in spider 2 in such a manner that the arm 28 of said lock will engage one end of a slot 29 formed in said bolt and move the same against the resistance of spring 24 when a key 30 is turned, such action being clearly shown in Fig. 8. Ring 18 will now fall and lock the steering-wheel as before described.

It will be seen that lock 26 is secured in position by means of an inclined screw 31, the head of which is concealed under cap 7 to prevent surreptitious removal thereof. One end of spring 24 rests against the inner end of a plug 32, which fits so tightly in spider 2 as to escape detection by anyone trying to tamper with the device. Bolt 23 is provided with a shoulder 33 adapted to contact with a stop 34 for limiting the movement thereof.

From the foregoing description, it will be seen that the device is very simple and readily manipulated, the use of a key being required only when the wheel is to be rendered operative for steering purposes.

In conclusion it is to be observed that the embodiment of my invention is not to be limited to the precise details of form, construction or arrangement above described and shown in the drawings; as, for example, the male and female members of the locking device may be triangular or oval instead of hexagonal, and the supporting flanges consist of a series of separated tongues, instead of continuous, and the continuous ring may be in the form of the segment of a circle.

Ball-bearings for the sleeve are preferably used, but it would not be a substantial departure from my invention to omit them in order to utilize the bolt of a lock for supporting the ring in its position and disconnecting the wheel from its post, instead of utilizing the bolt accompanying a pin lock.

In other words, my invention includes any locking device for detachably connecting the steering-wheel of an automobile with its post, the construction and arrangement of which are such that when released from the position it occupies for disconnecting the wheel from the post, it will be actuated by gravity to its other position for locking a wheel to its post.

Having described my invention, what I claim as new and desire to secure by Letters Patent is:

1. The combination with an automobile steering wheel, a post, a sleeve secured thereto, passing through and projecting below the underside of the wheel, the periphery of which projection is angular and terminates in a shoulder, and an internally angular locking ring surrounding said sleeve adapted to register with said peripheral surface and seat against said shoulder.

2. The combination with an automobile steering wheel, a post, a sleeve secured thereto passing through, projecting below the underside of the wheel and provided with an angular periphery terminating in a shoulder, of an internally angular locking ring adapted to seat on said shoulder and fall by gravity from its unlocked to its locked position in register with said peripheral surface to its seated position upon said shoulder, 3. The combination with an automobile steering wheel, a post, a sleeve secured thereto, projecting below the underside of the wheel and provided with an angular surface, of a gravity locking ring, a spring-actuated bolt for retaining said ring in its unlocked position and whereby on retracting the bolt, the ring falls by gravity to its operative locking position.

4. The combination with an automobile steering wheel, a post, a sleeve secured to said post, a sleeve projecting through said post provided with a gravity locking ring on the inner end of said post and a flanged cap on the outer end of said post, a flanged cap, a pin lock, a screw for securing said lock in the wheel, the end of which screw is concealed from view by said cap.

5. The combination with an automobile steering wheel, a post, a sleeve secured thereto projecting through the wheel, a ring adapted for locking and unlocking the wheel from said sleeve, a pin lock spring-seated bolt adapted to secure the locking ring in its elevated unlocked position, a screw for securing the barrel of said lock in the wheel, and a flanged cap for and free to rotate in said sleeve, the flange of which projects over and conceals said screw.

6. The combination with an automobile steering-wheel and post, of a sleeve fixed to the post and passing through said wheel, a cap-plate secured to the sleeve overlapping the wheel, ball-bearings between and supporting the wheel from the sleeve, and a locking device adapted to project into the wheel for disengaging the wheel from the sleeve and to move by gravity from the wheel to a seated position on the sleeve for locking the wheel to the latter.

7. The combination with the steering wheel and post of an automobile, a sleeve for the wheel surrounding and fixed to the post, said wheel being provided on its underside with an annular recess, of a locking ring surrounding and adapted to seat on said sleeve and be projected into said recess for disconnecting the wheel from the sleeve and moved by gravity to its seated position upon the sleeve for connecting the wheel to the latter and a lock for retaining said ring.

8. The combination with an automobile steering-wheel provided with a recess, a steering-post, an axial sleeve for the wheel secured to the post provided circumferentially with an irregular surface and a shoulder, of a locking device provided with an opening conforming thereto and adapted to be moved by gravity past said surface to a seated position on said shoulder and manually projected into the recess of the wheel.

9. The combination with an automobile steering-wheel provided with a recess, a steering-post, an axial sleeve for said wheel secured to the post provided with a hexagonal surface and a shoulder, of a slidable locking device conforming to said surface adapted to move by gravity to a seated position on said shoulder and manually in and out of register with said surface and to engagement with the wheel for disconnecting it from said post.

10. The combination with an automobile steering-wheel provided with a recess, a steering-post, a sleeve for said wheel secured to the post provided with an irregular surface and a shoulder, of a slidable locking device conforming to said surface and adapted to be moved by gravity from said surface to a seated position on said shoulder and manually rotatable in and out of register with said surface and to engagement with the wheel, and a key-operated bolt for securing the locking device to the wheel.

11. The combination with an automobile steering wheel post, of a locking ring adapted to move by gravity for locking the wheel in its operative position, and an automatically locking means adapted to lock the wheel in its operative position.

In witness whereof, I have hereunto set my hand and affixed my seal, this 17th day of July, A. D. 1920.

RUDOLF R. GRAEBERT. [L. S.]

Witnesses:
 Jno. G. Elliott,
 H. Slack.